United States Patent [19]
Bash et al.

[11] Patent Number: 5,463,677
[45] Date of Patent: Oct. 31, 1995

[54] METHOD AND APPARATUS FOR FACILITATING THE MAKING OF COLLECT CALLS

[75] Inventors: Stephan R. Bash, New York, N.Y.; Salvatore R. L. Di Rubbo, Port Murray, N.J.; Paul F. Gibilisco, Morris Township, Morris County, N.J.; Richard L. Mansdoerfer, Jr., Somerset, N.J.

[73] Assignee: AT&T Corp., Murray Hill, N.J.

[21] Appl. No.: 68,355

[22] Filed: May 27, 1993

[51] Int. Cl.[6] .............................. H04M 3/50; H04M 7/00
[52] U.S. Cl. .................. 379/88; 379/91; 379/132; 379/144; 379/112; 379/212; 379/213
[58] Field of Search ...................... 379/112, 144, 379/67, 88, 89, 132, 121, 91, 212, 213

[56] References Cited

U.S. PATENT DOCUMENTS

| | | | |
|---|---|---|---|
| 4,559,415 | 12/1985 | Bernard et al. | 379/67 |
| 4,918,722 | 4/1990 | Duehren et al. | 379/100 |
| 5,181,237 | 1/1993 | Dowden et al. | 379/88 |
| 5,193,110 | 3/1993 | Jones et al. | 379/89 |
| 5,319,701 | 6/1994 | Hird et al. | 379/132 |

Primary Examiner—Jeffery A. Hofsass
Assistant Examiner—Fan Tsang
Attorney, Agent, or Firm—Eugene J. Rosenthal

[57] ABSTRACT

When a caller making a collect call encounters a busy called party or one that does not answer after a prescribed time, the telephone network offers the caller the opportunity to store a voice message in a messaging system at no charge to the caller. After the caller stores a message, one or more attempts are made to establish a connection between the messaging system and the called party's telephone. This may be done by periodically alerting the called party's telephone when it is in an on-hook state. When the called party answers, e.g., by going off-hook, the messaging system informs the called party that a collect voice message awaits him and asks if he is willing to pay to receive same. If the called party signals that he is willing to pay to receive the voice message, the messaging system plays the stored voice message from the collect caller and signals the telephone network to charge the account of the called party for supplying the message. If the called party signals that he is unwilling to pay to receive the voice message, the message is not delivered.

22 Claims, 3 Drawing Sheets

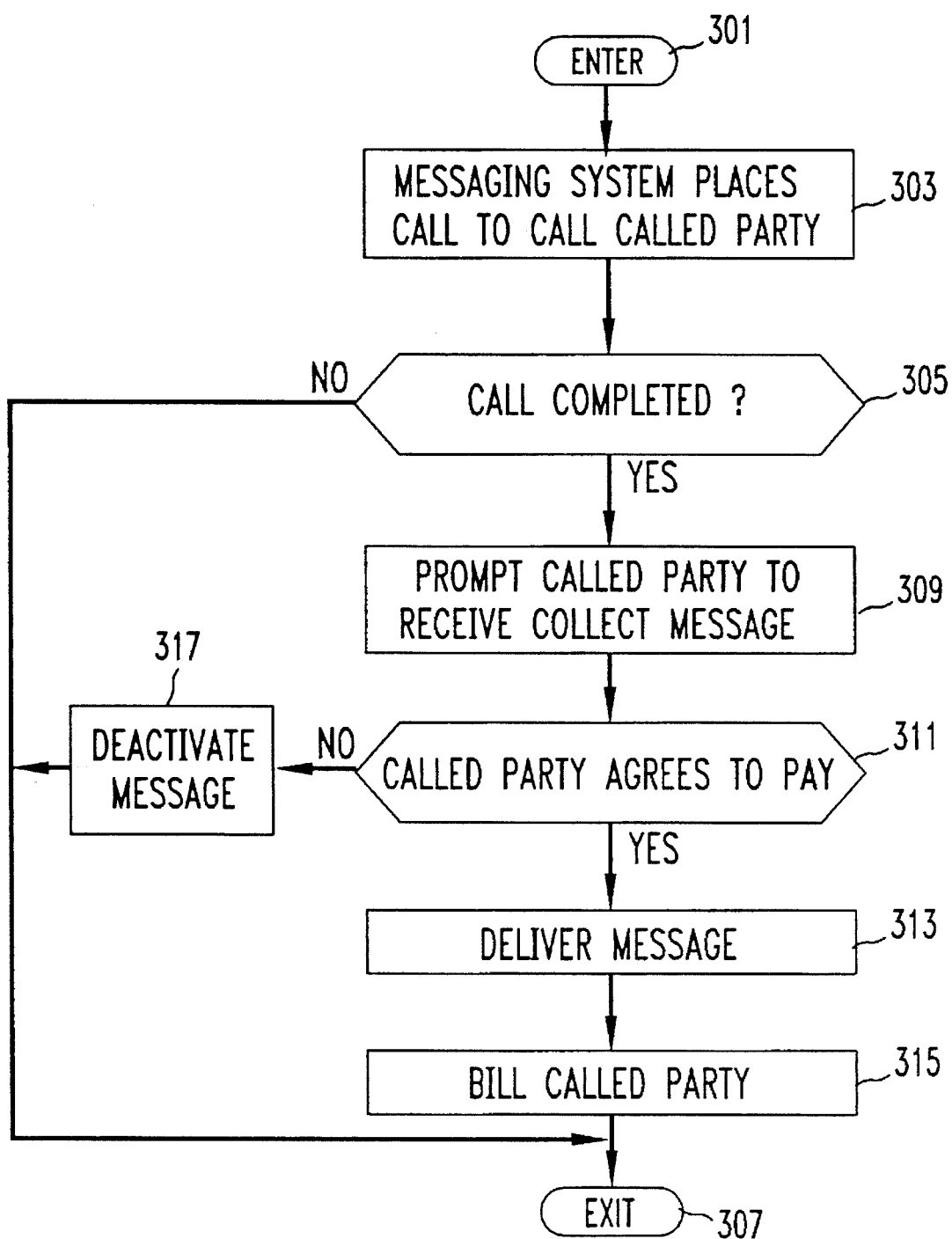

METHOD AND APPARATUS FOR FACILITATING THE MAKING OF COLLECT CALLS

TECHNICAL FIELD

This invention relates to the processing of collect calls.

BACKGROUND OF THE INVENTION

In the telephone network today, many collect calls go uncompleted. The reason for this often is that the call is unacknowledged by the called party, i.e., the called party is busy or does not answer. Thus, there is a loss of revenue to the telephone companies which cannot charge for these uncompleted calls.

It is known that an unacknowledged non-collect call can be routed to a messaging system that serves the called party. If a call is so routed, the caller pays for the time that he speaks to the messaging system as if the call was completed to the called party.

SUMMARY OF THE INVENTION

We have recognized that for an unacknowledged collect call, even if a messaging system is available to serve the called party, the caller can not leave a message because he cannot or will not pay the charges for the call connection to the messaging system. To overcome this problem, we extend the concept of collect calling to messaging, thereby yielding "collect messaging". In accordance with the principles of the invention, when a collect call is unacknowledged, e.g., it encounters a busy called party or one that does not answer after a prescribed time, the telephone network offers the caller the opportunity to store a message, e.g., a voice message, in a messaging system at no charge to the caller. After the caller stores a message, one or more attempts are made to establish a connection between the messaging system and the called party's telephone. This may be done by periodically alerting the called party's telephone when it is in an on-hook state. When the called party answers, e.g., by going off-hook, the messaging system informs the called party that a collect voice message awaits him and asks if he is willing to pay to receive same. If the called party signals that he is willing to pay to receive the voice message, the messaging system plays the stored voice message from the collect caller and signals the telephone network to charge the account of the called party for the message. If the called party signals that he is unwilling to pay to receive the voice message, the message is not delivered.

BRIEF DESCRIPTION OF THE DRAWING

In the drawing:

FIG. 3 shows a flowchart of an exemplary process for delivering a collect message, in accordance with the principles of the invention.

DETAILED DESCRIPTION

Figure 1:
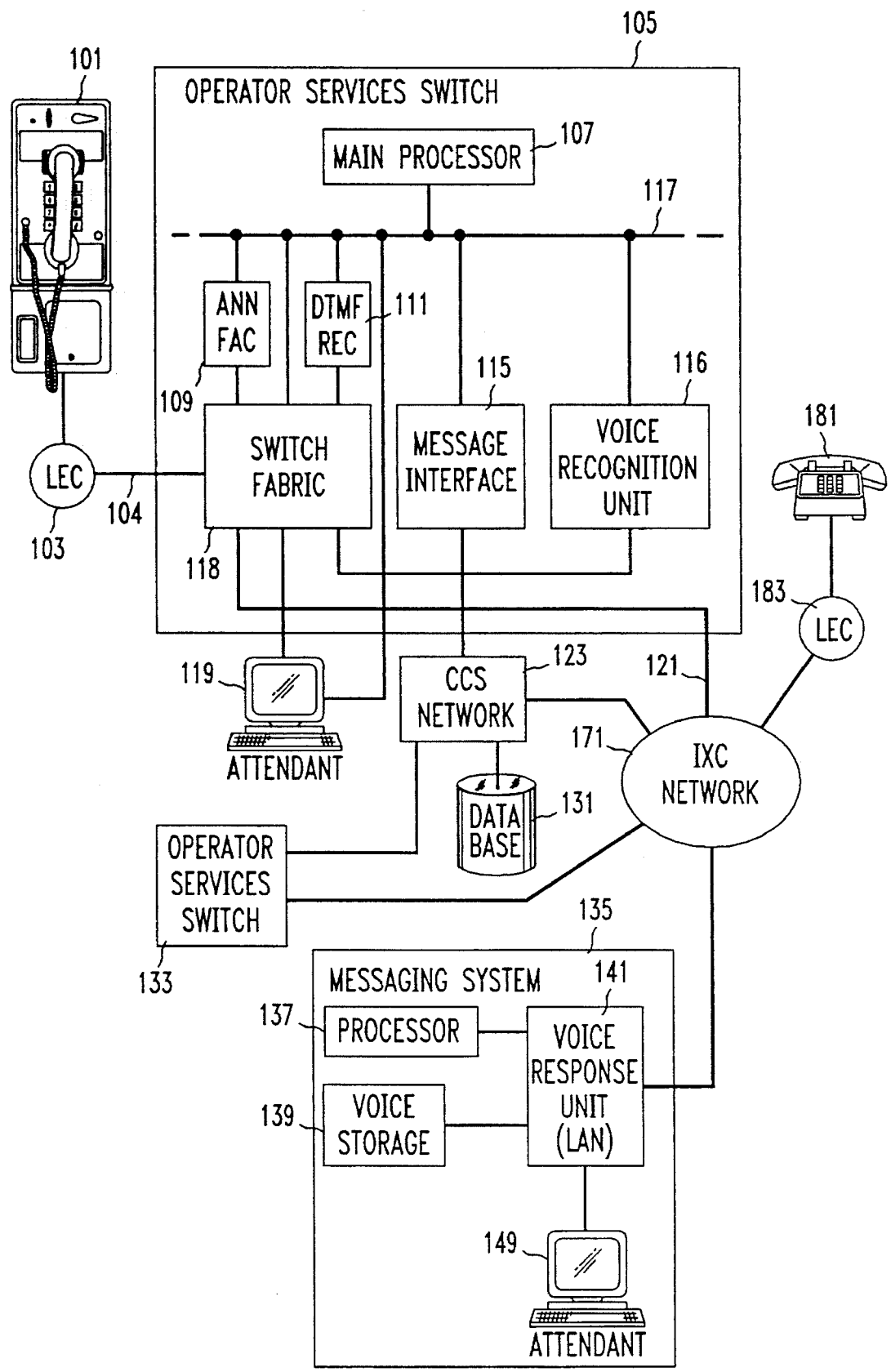
FIG. 1 shows an exemplary system for implementing the invention.

FIG. 1 shows an exemplary system according to the principles of the invention by which a caller who makes a collect call that is unacknowledged can leave a message for the called party, who must agree to pay for the receipt of the message before it will be delivered. The system includes: a) telephone stations 101 and 181, which may originate and receive calls, b) local exchange carriers (LECs) 103 and 183, c) operator services switches 105 and 133, with operator services switch 105 being shown in greater detail, d) CCS network 123, e) data base 131, f) messaging system 135, and g) IXC network 171.

Operator services switch 105 process collect calls and includes: a) main processor 107, b) announcement facility (ANN FAC) 109, c) dual tone multi-frequency receiver (DTMF REC) 111, d) message interface 115, e) bus 117, f) switch fabric 118 and g) voice recognition unit 116. Main processor 107 controls the overall operation of operator services switch 105 by performing any necessary processing and exchanging messages with the other components of operator services switch 105 over bus 117. Announcement facility (ANN FAC) 109 can present various announcements which can be heard by the calling party. The announcements, or combinative portions thereof, are prestored in announcement facility (ANN FAC) 109 and accessed by supplying announcement facility (ANN FAC) 109 with pointers to the announcements. Dual tone multi-frequency receiver (DTMF REC) 111 receives dual tone multi-frequency signals that are transmitted in response to the pressing of keys on the keypad of telephone station 101 and supplies the digit corresponding to each pressed key to main processor 107.

Message interface 115 is a protocol conversion unit that permits operator services switch 105 to communicate with a common channel signaling (CCS) network, such as CCS network 123. It is responsible for formatting all messages transmitted to CCS network 123 and for extracting responses received from CCS network 123. Other operator services switches, such as operator services switches 133 and 135, may also route messages via CCS network 123 to data base 131.

Switch fabric 118 can connect the trunk on which the calling party's call arrived at operator services switch 105, e.g., trunk 104, to a) announcement facility (ANN FAC) 109 b) dual tone multi-frequency receiver (DTMF REC) 111, c) voice recognition unit 116, d) attendant position 119, or e) to the rest of the interexchange carrier's network, via link 121. The purposes of such connections are described further below.

Attendant position 119, staffed by a human attendant, interfaces with operator services switch 105 via both bus 117 and switch fabric 118. The interface via bus 117 permits the attendant to exchange information with main processor 107. The interface via switch fabric 118 allows the attendant to converse with the calling party so as to aid him in the placing of a collect call or the initiation of the process for the storing of a collect message, should it be necessary.

IXC network 171 includes those parts of the network of the IXC that is carrying the collect call that are not more specifically shown in FIG. 1. In particular, IXC network 171 includes both signaling and transmission capabilities.

Figure 2:
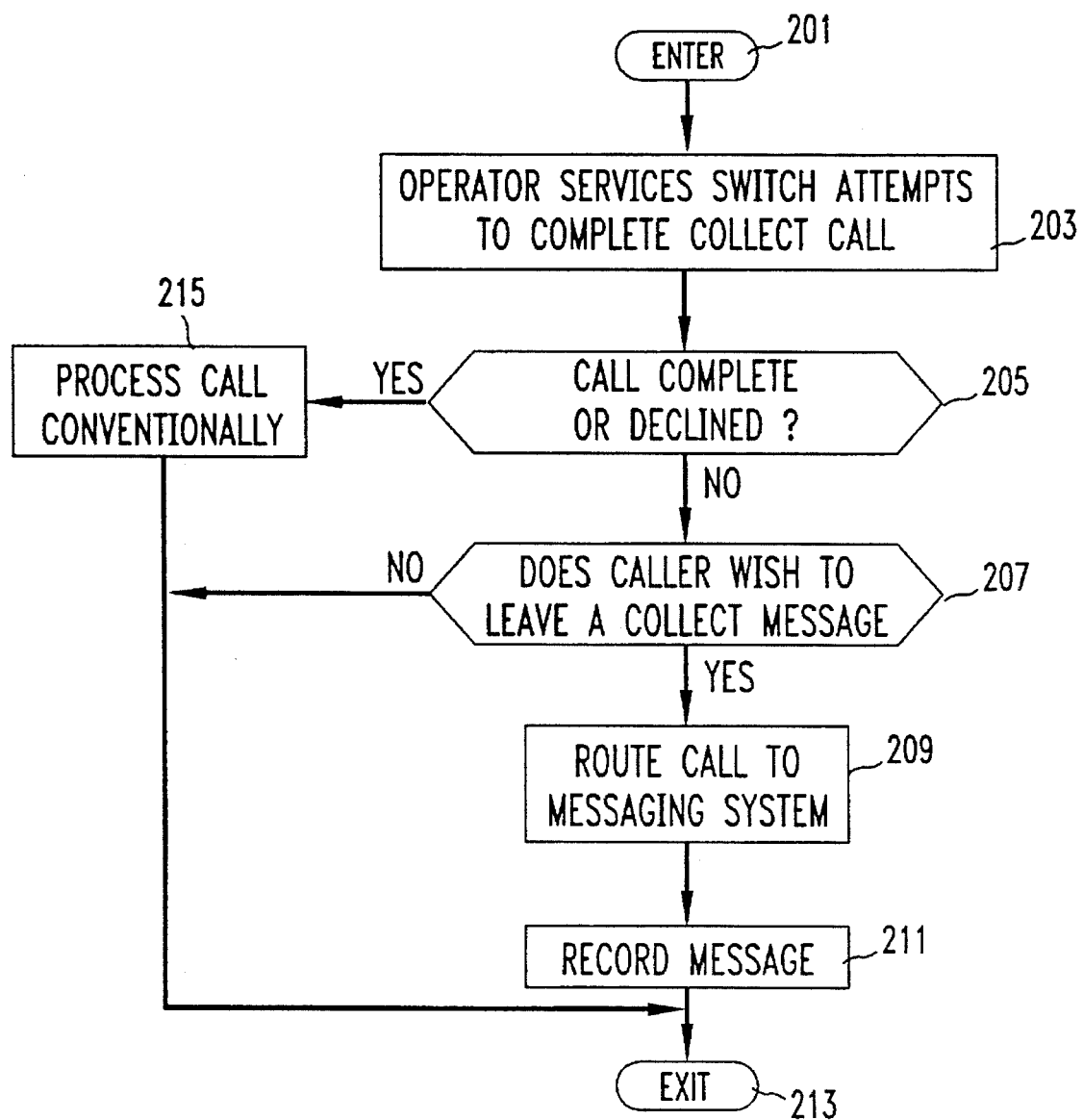
FIG. 2 shows a flowchart of an exemplary process for the making of collect calls for which the calling party may leave a collect message for the called party, in accordance with the principles of the invention.

FIG. 2 shows a flowchart of an exemplary process for the making of collect calls for which the calling party may leave a collect message for the called party, in accordance with the principles of the invention. The process is entered in step 201 when a calling party originates a collect call at telephone station 101 (FIG. 1), by a) dialing 0+area code+number or b) interexchange access code+0+area code+number. A switch of local exchange carrier (LEC) 103 receives the dialed digits and, from the dialed 0, recognizes that the call is an operator services type of call that may be a collect call. Therefore, local exchange carrier (LEC) 103 will route the call to an operator services switch for further handling.

If an access code for a specific interexchange carrier (IXC) is not specified as part of the digits dialed by the calling party but yet the call must be carried by an interexchange carrier, local exchange carrier 103 routes the call over a trunk, e.g., trunk 104, to operator services switch 105 of an interexchange carrier. Local exchange carrier 103 is aware of a default interexchange carrier to which telephone station 101 has been assigned. If the dialed digits include an access code specifying a particular interexchange carrier, local exchange carrier 103 routes the call over a trunk to an operator services switch 105 of the specified interexchange carrier. If the call is one which is not to be carried by an interexchange carrier, local exchange carrier 103 routes the call to one of its own operator services switches.

In step 203, operator services switch 105 attempts to complete the collect call to the called party, in the conventional manner. For automatic processing of the collect call, all prompting is performed by operator services switch 105 (FIG. 1) causing announcement facility (ANN FAC) 109 to play appropriate announcements to the caller. Switch fabric 118 connects the caller's call on trunk 104 to announcement facility (ANN FAC) 109 so that the caller may hear the prompts. By pressing keys at telephone station 101, the caller supplies his responses to the prompts in the form of dual tone multi-frequency (DTMF) signals. To receive and decode the dual tone multi-frequency (DTMF) signals supplied by the caller, dual tone multi-frequency receiver (DTMF REC) 111 is connected to the caller's call, via switch fabric 118. Messages corresponding to the decoded received signals are transmitted to data base 131 via message interface 115 and CCS network 123. In an alternative embodiment, the caller could supply his responses to the prompts in the form of speech which is received and decoded by voice recognition unit 116.

Conditional branch point 205 tests to determine if the collect call was successfully completed, i.e., a) the charges were accepted by the called party and a connection was established, or b) the call was declined, i.e., the called party refused to accept the charges for the call. If the test result in step 205 is NO, indicating that either a busy called party or one that did not answer after a prescribed time was encountered, i.e., the call was unacknowledged, control passes to conditional branch point 207, which tests to determine if the calling party wishes to leave a collect message, in accordance with an aspect of the invention. In one embodiment of the invention, the calling party is given a period of time to enter his response. The calling party will have previously been informed, e.g., by advertising or direct mail, that he should enter at his telephone keypad a particular code indicating that he desires to leave a collect message. In another embodiment of the invention, this step is performed by prompting the calling party with a message 1) that it is possible for him to leave a collect message and 2) informing him how to respond if he wishes to do so.

If the test result in step 207 is YES, control passes to step 209, in which the call is routed through IXC network 171 to messaging system 135. In one embodiment of the invention the call is forwarded through IXC network to messaging system 135. In another embodiment of the invention, a toll free, e.g., 800-type, telephone call is placed by operator services switch to the telephone number of messaging system 135.

Messaging system 135 includes a) processor 137, b) voice storage 139, c) voice response unit (LAN) 141 and d) attendant position 149. Processor 137 provides all the computational capability necessary to control all the processes of messaging system 135. Voice storage 139 stores voice messages. Voice response unit (LAN) 141 is at least one unit capable of communicating with a caller or a called party. Such a unit is reminiscent of a small operator services switch in that it includes, typically, a) dual tone multi-frequency receivers, b) an announcement facility, and c) optionally, a switch fabric to route calls to its various units. Voice response unit (LAN) 141, under control of processor 137, can retrieve messages from and record messages on voice storage 139. If voice response unit (LAN) 141 is made up of several smaller units, the smaller units may be interconnected by a local area network (LAN). A commercially available voice response unit is the AT&T Conversant system.

Attendant position 149, staffed by a human attendant, also interfaces with voice response unit (LAN) 141. The interface allows an attendant to converse with the calling party or called party, depending on the current function being performed by voice response unit (LAN) 141, to aid them in storing or retrieving a collect message.

In step 211, after the calling party has been connected to messaging system 135, the calling party's message is recorded in voice storage 139 by messaging system 135, in accordance with the principles of the invention. The process then exits in step 213. If the test result in step 205 is YES, indicating that the collect call was completed or declined, control passes to step 215, in which the collect call is processed conventionally. The process then exits in step 213. If the test result in step 207 is NO, indicating that the calling party does not wish to leave a collect message for the called party, control passes to step 213 and the process exits.

FIG. 3 shows a flowchart of an exemplary process for delivering a collect message, in accordance with the principles of the invention. For each "active" message stored, the process is periodically entered by messaging system 135 in step 301. An "active" message is a message for which the time period during which attempts will be made to deliver the message has not yet expired. The process may be entered, for example, by the expiration of a timer that has been set for a particular message and the consequent occurrence of a system interrupt in messaging system 135. The entire process of FIG. 3 can thus be repeated several times.

In step 303, message system 135 places a call to the party for whom the message is destined, i.e., the called party of a previously unacknowledged collect call, the message having been stored in step 211 of the process shown in FIG. 2. Conditional branch point 305 tests to determine if the call originated by message system 135 was completed, i.e., was it answered. If the test result in step 305 is NO, indicating that the call was not answered within a prescribed period, control passes to step 307 and the process is exited. If the test result in step 305 is YES, indicating that the call was answered, control passes to step 309 in which the called party is asked if he is willing to accept the charges for a collect message, i.e., he is informed that there is a message awaiting him and that in order to receive the message, he must agree to pay the associated delivery charges.

Thereafter, conditional branch point 311 tests to determine if the called party agreed to pay the charges for the collect message, in accordance with the principles of the invention. If the test result in step 311 is NO, control passes to step 317 and the message is deactivated. In one embodiment of the invention, the message is marked as one that is no longer active. In an alternative embodiment of the invention, the message is erased. The process is then exited in step 307.

If the test result in step 311 is YES, indicating that the called party agreed to pay the charges for receiving the message, control passes to step 313 in which message system 135 plays, or delivers, the message to the called party, in accordance with an aspect of the invention. Next, in step 315, the called party is billed for receipt of the message, in accordance with the principles of the invention. In one embodiment of the invention a billing record for the message is generated in IXC network 171. In another embodiment of the invention, processor 137 generates the billing record, which it stores in its local storage. From the stored billing record a bill may be printed and sent to the called party. The process then exits in step 307.

In other embodiments of the invention, the functionality of recording and delivering the collect messages may be divided up differently between massaging system 135, operator services switch 105, CCS network 123 and data base 131. Such embodiments will be readily apparent to those skilled in the art. Furthermore, the message that is delivered need not be a voice message stored by the caller. Instead, the message supplied by the caller may be supplied in some other form, e.g., a) as dual tone multi-frequency signals entered from the keypad of the calling telephone station set, b) as data, perhaps from a modem call, c) as video, or d) as facsimile. If the message supplied by the caller is dual tone multi-frequency signals or data, text-to-speech conversion may be employed so that the called party can retrieve the message from any conventional telephone. If the message supplied by the caller is facsimile, the called party may be instructed to engage his facsimile terminal to receive a message after he agrees to pay for receipt of the message. Furthermore, the message need not be directly supplied by the caller but instead it may be generated by the system providing the collect messaging service, with the message being created only in response to the caller indicating to do so. One such exemplary collect messaging system generated message is the telephone number from which the caller is calling, which would be delivered to the called party if he agreed to pay to receive it. How to implement such embodiments of the invention will be readily apparent to those skilled in the art from the foregoing.

The foregoing merely illustrates the principles of the invention. It will thus be appreciated that those skilled in the art will be able to devise various arrangements which, although not explicitly described or shown herein, embody the principles of the invention and are thus within its spirit and scope.

We claim:

1. Apparatus for use in processing collect calls, comprising:
   means for determining that a collect call placed by a caller to a called party is unacknowledged;
   means for recording a message from said caller;
   means, responsive to a received indication that said called party agrees to pay to receive said message, for supplying said message to said called party, said indication being received from said called party after the conclusion of said collect call; and
   means, responsive to said indication, for charging said called party for being supplied with said message.

2. The invention as defined in claim 1 further including means for informing said called party that said message awaits him and that said message will be supplied to said called party if said called party agrees to pay to receive it.

3. The invention as defined in claim 1 wherein said message includes a voice message.

4. The invention as defined in claim 1 wherein said message includes a video message.

5. The invention as defined in claim 1 wherein said message includes a facsimile message.

6. The invention as defined in claim 1 wherein said message includes a data message.

7. Apparatus for use in processing collect calls, comprising:
   means for determining that a collect call placed by a caller to a called party is unacknowledged;
   means responsive to said determining means for recording a message from said caller;
   means for receiving from said called party, after termination of said collect call, an indication that said called party agrees to pay to receive said message;
   means responsive to said receiving means for supplying said message to said called party; and
   means for charging said called party for being supplied with said message.

8. Apparatus for use in processing collect calls, comprising:
   means for recording a message for a called party in response to a collect call placed to said called party that is busy or unanswered; and
   means, responsive to an indication received over a second call originated alter recordation of said message that said called party agrees to pay to receive said message, for supplying said message to said called party.

9. Apparatus for use in processing collect calls, comprising:
   means for recording a message from a caller if a collect call placed by a caller to a called party is unacknowledged;
   means for (i) originating a second call and for (ii) receiving over said second call an indication that said called party agrees to pay to receive said message;
   means responsive to said indication for supplying said message to said called party.

10. The invention as defined in claim 9 further including means for charging said called party for being supplied with said message.

11. A method for processing a collect call from a caller to a called party, comprising the steps of:
    identifying a received call as a collect call;
    determining that said called party is unavailable; and
    storing a message for said collect call to be delivered to said called party only after a signal that said called party agrees to pay a required fee to receive said message is received from said called party over a second telephone call.

12. The invention as defined in claim 11 further including the step of:
    announcing to said caller that a message may be stored for delivery to said called party and that said message will be delivered only if said called party agrees to pay a required fee to receive said message.

13. A method for use in a telephone network, comprising the steps of:
    determining that a message is stored for delivery to a telephone line presently corresponding to particular telephone number;

alerting a telephone having said telephone number;

receiving an indication that said telephone is answered;

announcing that said message is stored and can be retrieved if a required fee will be paid; and supplying said message to said telephone if a response to said announcement indicates that said required fee will be paid.

14. The invention as defined in claim 13 further including the step of:

deactivating said message if a response to said announcement indicates that said required fee will not be paid.

15. A method for use in processing collect calls, comprising the steps of determining that a collect call placed by a caller to a called party is unacknowledged;

recording a message from said caller;

supplying said message to said called party over a second call in response to an indication received over said second call that said called party agrees to pay to receive said message.

16. The invention as defined in claim 15 further including the step of:

charging said called party for being supplied with said message.

17. The invention as defined in claim 15 wherein said message includes a voice message.

18. The invention as defined in claim 15 wherein said message includes a video message.

19. The invention as defined in claim 15 wherein said message includes a facsimile message.

20. The invention as defined in claim 15 wherein said message includes a data message.

21. A method for use in a system processing collect calls, comprising the steps of storing a message in response to a determination that a collect call placed by a caller to a called party is unacknowledged;

supplying said message to said called party over a second call in response to an indication received over said second call that said called party agrees to pay to receive said message.

22. The invention as defined in claim 21 wherein said message is generated by said system.

* * * * *